UNITED STATES PATENT OFFICE.

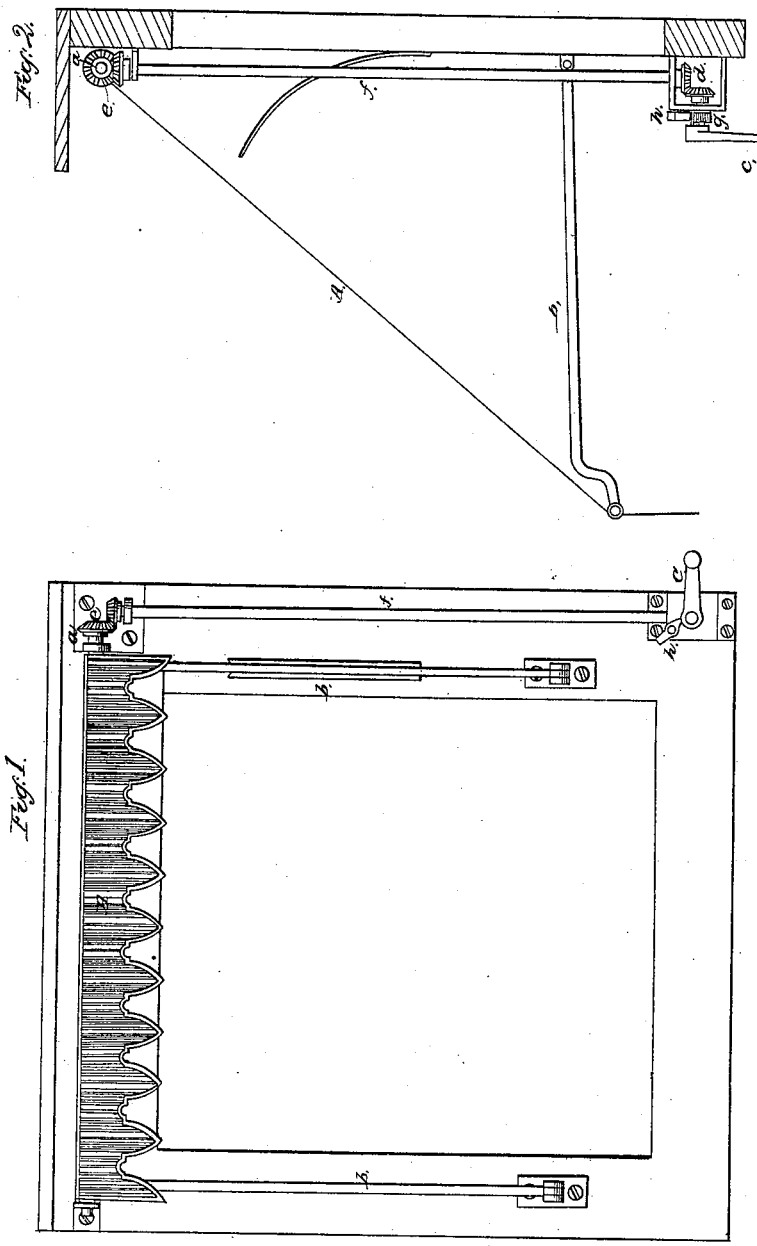

EMILE E. LAUMONT, OF NEW YORK, N. Y.

IMPROVED AWNING.

Specification forming part of Letters Patent No. 50,479, dated October 17, 1865.

*To all whom it may concern:*

Be it known that I, EMILE E. LAUMONT, of the city, county, and State of New York, have invented a new and Improved Awning; and I do hereby declare that the following is a full, clear, and exact description thereof, which will enable others skilled in the art to make and use the same, reference being had to the accompanying drawings, forming part of this specification, in which—

Figure 1 represents a front elevation of this invention. Fig. 2 is a transverse vertical section of the same.

Similar letters of reference indicate like parts.

This invention relates to an awning the outer end of which is secured to two hinged rods or to a frame, its inner end being fastened to a roller, to which a revolving motion can be imparted by a crank on the inside of the window, said crank being made to connect with the roller by an upright shaft and suitable bevel-gear in such a manner that by the action of the hinged rod the awning is drawn out and held in the desired position as soon as the same is unrolled from the roller, and by turning the crank it can be taken in partially or wholly at any moment without raising the window and without trouble.

A represents an awning, which is secured with its inner end to a roller, $a$, and with its outer end to two rods, or to a frame, $b$, which is hinged to the outside of the window-frame and on opposite sides of the window, as shown in the drawings. The outer ends of the side rods of said frame are curved so that they clear the roller when the awning is taken in.

By turning the roller $a$ in the required direction the awning rolls up on the same, or by turning it in the opposite direction the awning unrolls. The requisite revolving motion is imparted to said roller by means of a crank, $c$, which is intended to be arranged on the inside of the window or in any convenient position, and which connects with the roller $a$ by bevel-gears $d$ $e$ and an upright shaft, $f$. A ratchet, $g$, and pawl $h$, allows of arresting the crank in any desired position. When the awning is unrolled the hinged frame $b$ carries the outer one of the same out from the window to the position shown in Fig. 2, and in order to cause said frame to fall out readily, a spring, $i$, may be made to act on one or both of the side rods thereof.

It will be readily understood that by this arrangement the awning can be taken in or let out with the greatest ease and facility. It can be arrested in any desired position, and the mechanism used for operating the same is durable and not liable to get out of order.

I claim as new and desire to secure by Letters Patent—

The roller $a$, operated by the crank $c$, in combination with the hinged frame $b$ and awning A, constructed and operating substantially as and for the purpose set forth.

The above specification of my invention signed by me this 23d day of August, 1865.

EMILE E. LAUMONT.

Witnesses:
P. LAMI,
M. M. LIVINGSTON.